July 30, 1968 B. WIDROW ET AL 3,395,402

ADAPTIVE MEMORY ELEMENT

Filed May 27, 1965 2 Sheets-Sheet 1

INVENTORS
BERNARD WIDROW
GENE FRICK
RONALD H. GORDON

Flehr and Swain
ATTORNEYS

INVENTORS
BERNARD WIDROW
GENE FRICK
RONALD H. GORDON
Flehr and Swain
ATTORNEYS 3,395,402
Patented July 30, 1968

3,395,402

ADAPTIVE MEMORY ELEMENT

Bernard Widrow, Stanford, Gene Frick, Palo Alto, and Ronald H. Gordon, Los Altos, Calif., assignors to Memistor Corporation, Mountain View, Calif., a corporation of California Filed May 27, 1965, Ser. No. 459,368
6 Claims. (Cl. 340—173)

This invention relates generally to an adaptive memory element and more particularly to a memory element having an analog memory.

In copending application Ser. No. 136,829, filed Sept. 8, 1961, now Patent No. 3,222,654, there is described an electronically controlled variable resistor with analog memory. Its resistance can be reversibly by DC current in a "source" lead which plates a metallic film on a "substrate" causing the electrical conductance of the substrate to change.

Memory elements of the foregoing character are valuable in adaptive control systems and in adaptive pattern recognition systems. Such elements are also useful in gain control circuits, regulator circuits, frequency and phase control circuits, DC amplifiers, integrator and differentiator circuits, and applications where an electronically variable resistance is desirable or useful.

It is a general object of the present invention to provide an adaptive memory element having a glass envelope.

It is a further object of the present invention to provide an adaptive memory element which has good stability and is reliable in operation.

It is another object of the invention to provide an adaptive memory element of the above character having a solid metal substarte, such as a wire substrate.

It is a further object of the present invention to provide an adaptive memory element sealed in a glass envelope to prevent loss of electrolyte, to premit operation at high temperatures, and to reduce diffusion of oxygen and other contanimants into the cell.

It is another object of the present invention to provide a memory element enclosed in a glass package which includes means for minimizing the deleterious effects of anode sediment formation on device operating life and stability.

It is a further object of the present invention to provide a memory element having a glass envelope and including means for accommodating differential expansion of the envelope and electrolyte contained therein.

It is a futher object of the present invention to provide a memory element including a glass support for the substrate which supports the substrate in approximately the center of the envelope to keep the substrate immersed in electrolyte away from any sediment and from the vapor bubble.

It is a further object of the present invention to provide an adaptive memory device of the foregoing character which includes means for controlling its saturation.

The foregoing and other objects of the present invention will become more clearly apparent from the following description when taken in conjunction with the accompanying drawing.

Referring to the drawing.

Figure 1:
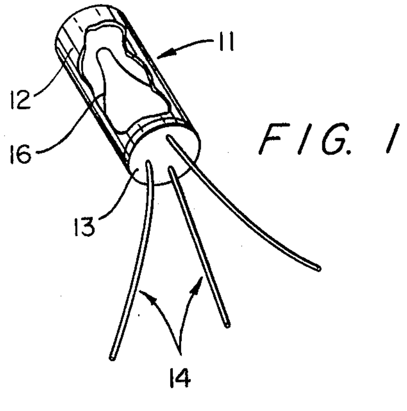
FIGURE 1 is a perspective view of an encapsulated device.

In FIGURE 1 there is shown an encapsulated device 11. The device includes a cover 12 secured to a header or base 13 through which the leads 14 extend. The space bewteen the cover and the memory element may be filled with a suitable material.

Figures 2, 5:
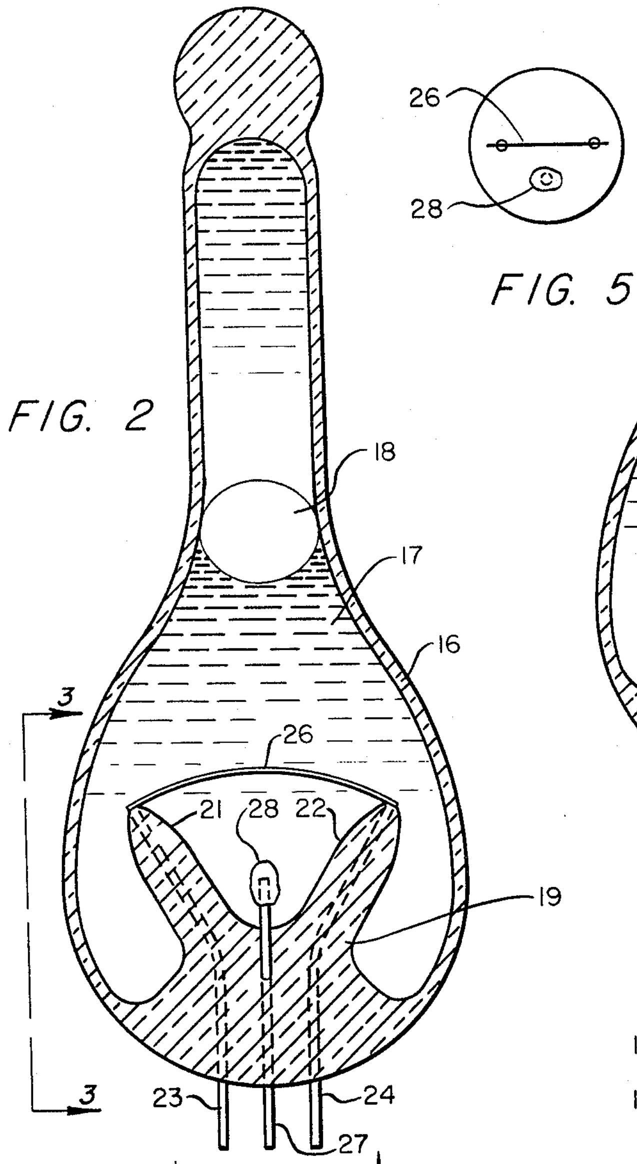
FIGURE 2 is an elevational view showing one type of adaptive memory element in accordance with the invention.
FIGURE 5 is a view taken generally along the line 5—5 of FIGURE 4.
Figure 3:
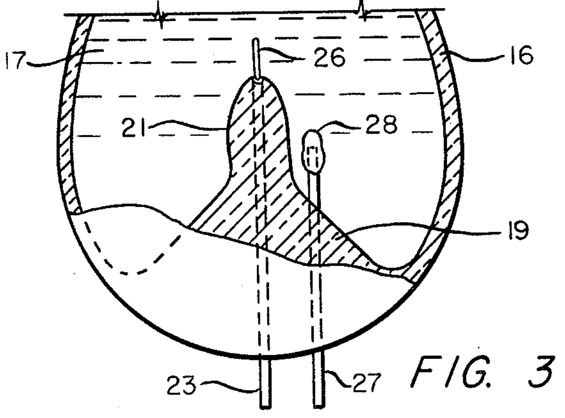
FIGURE 3 is a view taken generally along the line 3—3 of FIGURE 2.

Referring particularly to FIGURES 2 and 3, an adaptive memory element is shown. The element includes a sealed glass envelope 16 which is filled with an electrolyte 17. The volume of the electrolyte is less than the internal volume of the glass package 16 to provide a void or empty space which is filled with the vapor phase of the electrolyte.

A pedestal 19 including spaced glass supports 21 and 22, in the form of upstanding ears, extends into the envelope. Leads 23 and 24 extend coaxially within the ears or supports and terminate flush with the top of the supports. As will be presently described, the leads preferably have a relatively low resistance in comparison to the substrate 26 connected therebetween. An anode or source lead 27 extends through the pedestal into the electrolyte. This lead carries source or plating material 28. The leads 23, 24 and 27 are suitably sealed to the pedestal by glass-to-metal sealing techniques well known in the art. The resistive element 26, which acts as a substrate and onto which is plated material 28, is suitably joined to the flush ends of the leads 23 and 24 as, for example, by spot welding.

Operation of the device is substantially as follows. A plating current is applied between one of the leads 23 or 24 and the anode whereby material 28 is transferred from the anode to the substrate. As material builds onto the substrate, its cross-sectional area increases and its resistance, therefore, decreases. To increase the resistance, the plating current is reversed and material is removed from the substrate and plated back onto the source. This is a reversible process. The amount of material which is transferred is dependent upon the magnitude of the current and elapsed time.

The resistance of the substrate is preferably non-destructively measured by means employing alternating electrical current so that there is no plating action during the non-destructive sensing. A direct electrical current would cause material to be removed from one end of the substrate and deposited on the other, thus disturbing the stored information.

Figures 6, 7, 8:
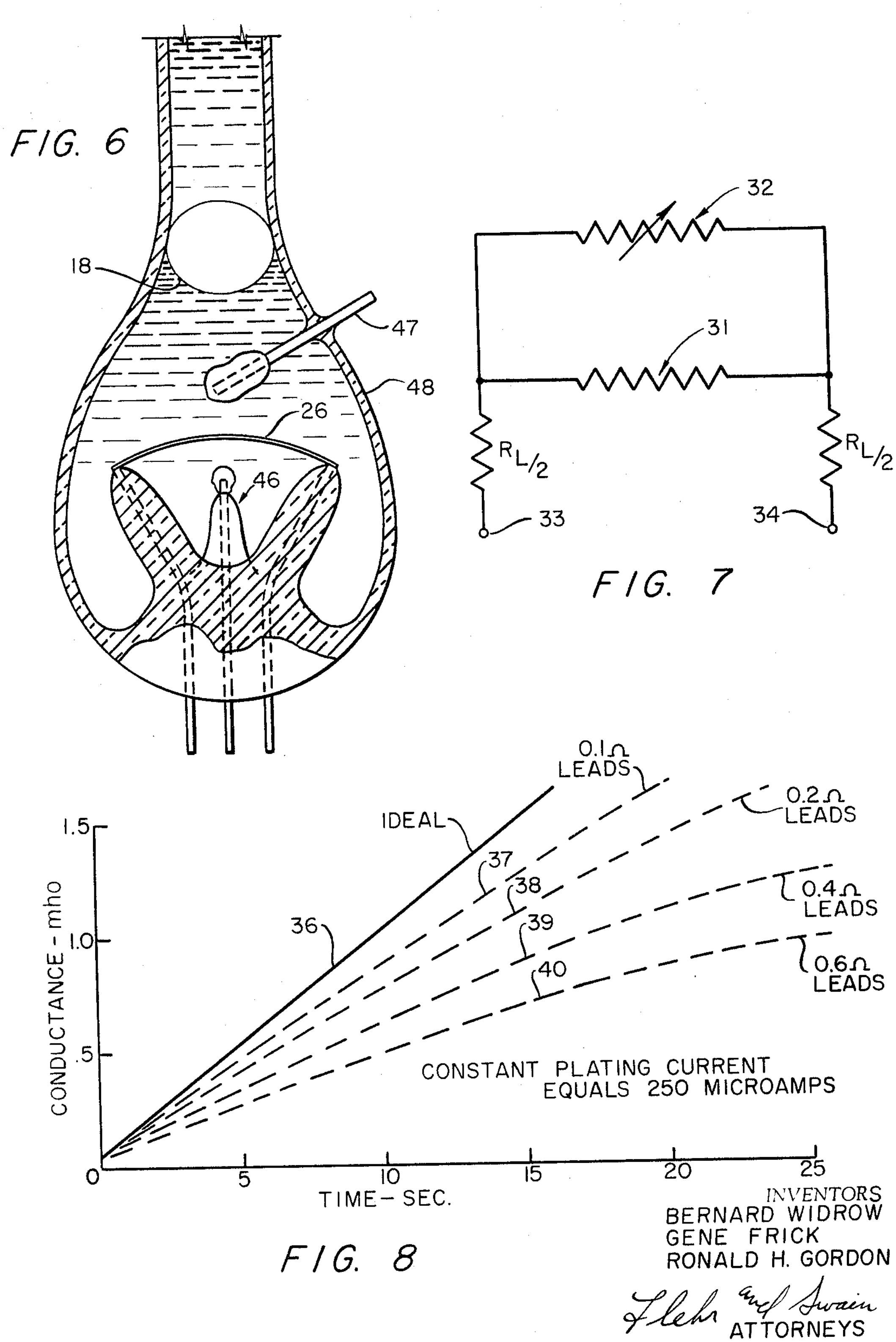
FIGURE 6 shows a two-anode adaptive memory element.
FIGURE 7 is a schematic circuit diagram showing the resistances present in an adaptive memory element.
FIGURE 8 is a plot showing the conductance as a function of the time for typical adaptive memory elements.

Referring to FIGURE 7, there is shown an equivalent circuit for a memory element. The leads are represented by the resistors $R_L/2$; the substrate is represented by the resistor 31; and the material plated to the substrate is represented by the variable resistor 32. The equation gives the conductance G, which will be observed between the terminals 33, 34:

$$G=\frac{1}{R}=\frac{1}{R_L+\frac{1}{G_0+G_1q}}$$

where $$q=\int_0^t idt$$

R=resistance between terminals 33 and 34
G=conductance between terminals 33 and 34
$R_L$=lead resistance $G_0$=conductance ($1/R_0$) of substrate
$G_1$=constant
$i$=plating current
$t$=time
$q$=plated charge It is noted for a device in which the conductance varies linearly with $q$, the lead resistance should be zero. The conductance would then be $$G_i = G_0 + G_1 q$$

when $G_i$ is the ideal conductance. This is shown by curve 36, FIGURE 8, when the substrate conductance $G_0$ is .04 mho. When there is lead resistance, the expression for conductance becomes $$G = \frac{G_i}{1 + R_L(G_i)}$$

and the variation of G with respect to $q$ is no longer linear as shown by curves 37–40.

The greater the lead resistance, the greater the departure from ideal and the greater the non-linearity.

It can be concluded that better linearity can be obtained by shortening the leads and increasing their diameter and by operating over a smaller dynamic range. It is observed that a device having low lead resistance is more sensitive. Note, for example, the time required to obtain 1 ohm resistance with various lead resistances.

As previously described, there is a so-called vapor pocket or void in the device. This void or pocket is required to prevent rupture of the glass envelope when there are changes in ambient temperature. The following table shows the relative volume of the electrolyte, the glass envelope and the vapor pressure of the liquid as a function of temperature.

TABLE

| Temperature, ° C | 0 | 25 | 50 | 75 | 100 | 125 |
|---|---|---|---|---|---|---|
| Relative Volume: | | | | | | |
| Solution | 1.000 | 1.008 | 1.020 | 1.035 | 1.051 | 1.070 |
| Glass | 1.000 | 1.0004 | 1.0007 | 1.0011 | 1.0015 | 1.0019 |
| Vapor Pressure of electrolyte, atm | | 0.03 | 0.12 | 0.36 | 0.95 | 2.0 |

It is to be noted that the relative volume increases about 7 percent between 0° C. and 125° C., while the vapor pressure increases to about two atmospheres for the same temperature change. It is also observed that the change in volume of the glass is negligible by comparison. Thus, to obtain a device which will tolerate a temperature range of from 0° C. to 125° C., a void or pocket having a volume of seven percent of that of the electrolyte should be provided. The maximum expansion occurs at the highest temperature (125° C.). The glass bulb should also be constructed so that it can withstand the two-atmosphere pressure at this temperature.

The void or pocket is preferably filled with oxygen-free vapor. Any oxygen which is present when the package is sealed will react with the plating material on both the source and the substrate forming an oxide which is soluble in the electrolyte. This causes instability of the stored information. This instability will continue until the oxygen has been exhausted. Further oxidization of the solution will be prevented because of the encapsulation within the glass package.

Repetitive plating and deplating of the substrate produces a conductive sediment of the plated material which tends to collect on any flat surface. Sediment in contact with the substrate leads will provide a large area which will attract plating in competition with the substrate. This causes the plating speed of the device to be diminished. It is possible for excessive deposits of sediment to form a short circuit between the source and substrate electrode, entirely preventing plating. In the package shown in FIGURES 2 and 3, the supports 21 and 22 are pointed whereby very little sediment can collect regardless of the orientation of the device. The sediment within the solution does not appreciably affect the characteristics of the device and it is only the sediment which would collect and be in contact with the substrate leads that is troublesome. The devices shown in FIGURES 2, 3 and 6 have proven to be relatively trouble-free in this respect.

A memory element of the foregoing type was assembled as will be presently described. The leads 23, 24 and 27 were a tungsten-platinum alloy and had a diameter of 5 mils. The alloy was 4 percent tungsten and 96 percent platinum. The tungsten is added to the platinum to increase its resistivity to permit spot welding of the substrate to the ends of the leads, as previously described. The substrate wire was a tungsten-platinum alloy having a diameter of .32 mil. The alloy was 8 percent tungsten and 92 percent platinum.

The substrate length was 0.1 inch and had a conductance of 0.04 mho. The lead length was .75 inch and had a conductance of 0.6 ohm. The device was operated with a current of 250 microamps. Curve 40, FIGURE 8, shows the conductance as a function of time. The electrolyte was a water solution containing 1 mole per liter of sulfuric acid and .66 mole per liter of copper sulphate at 25° C.

Figure 4:
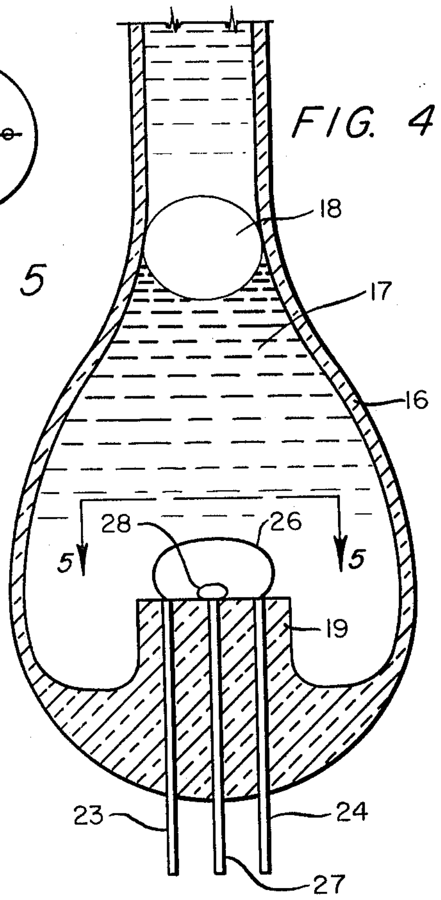
FIGURE 4 is a side elevational view of another type of adaptive memory element in according with the invention.

Referring to FIGURES 4 and 5, there is shown a device quite similar to that of FIGURES 2 and 3 in which like reference numerals are applied to like parts. In this form, the pedestal is flat and the substrate is welded to the ends of the wires extending to the flat side. A device of the type shown in FIGURES 3 and 4 is more susceptible to sediment. However, this is a slightly cheaper package because of the simple configuration of the pedestal.

It is possible in the type of device shown in FIGURES 4 and 5 that the vapor bubble could come in contact and partially envelop the substrate element in certain orientations of the device thereby adversely affecting the plating process. This is essentially alleviated by mounting the substrate in the center of the envelope by attachment to the spaced supports, as shown in FIGURES 2, 3 and 6.

It is to observed from FIGURES 2 and 3 that when all of the plating material is plated from the source onto the substrate, the device is saturated and there can be no further change of resistance. The amount of plating material available determines the saturation point.

Referring to FIGURE 6, there is shown a device in which the saturation point can be controlled. In this device, there is provided a pair of anodes or sources which have material plated thereon. Thus, there is a main anode 46 of the type previously described and an auxiliary anode 47. Each of the anodes has plated thereon plating material. By plating between the auxiliary anode 47 and the main anode 46, the amount of plating material available at the main anode is controlled. Thus, the saturation point can be easily controlled by plating material between the anodes 46 and 47 and then operating the device in the usual manner to plate material from anode 46 onto substrate 26. Thus, anode 47 becomes a storage point for the plating metal or material. The saturation point is determined by the amount of metal plated initially from anode 47 to anode 46. The main anode is shown extending through a glass support 48 of the type previously described. This provides isolation for this electrode.

Memory elements in accordance with the invention may be constructed by sealing a glass bead to the substrate and source leads. A cylindrical glass member may be slid over the substrate leads and heated whereby it fuses with the bead and seals to the leads to form the supports. The substrate leads are cut off flush with the ends of the supports and the substrate wire is welded to the ends of the same. The bead is then placed within a glass tube and the tube and bead are heated to form a seal. A predetermined amount of electrolyte is then placed within the tube to submerge the substrate. A source of plating metal, such as a wire, is inserted in the tube until the end is submerged in the electrolyte. Plating current is then caused to flow between the wire and the source lead. A predetermined amount of plating material is electroplated from the wire onto the source lead. The wire is then removed.

A vacuum is applied to the upper end of the tube to evacuate the interior of the tube. A portion of the tube is then heated while the vacuum is being applied whereby to collapse the tube and form an envelope containing the electrolyte. The tube is heated above the level of the electrolyte so that upon collapsing, there remains a vapor pocket. The sealed envelope is, therefore, purged of substantially all oxygen and the pocket comprises substantially vapor of the electrolyte.

We claim:

1. A memory element comprising a vitreous envelope having a predetermined internal volume, a predetermined volume of electrolyte disposed in said envelope, said volume of electrolyte being less than the predetermined internal volume of the envelope whereby to provide a pocket in said envelope to accommodate expansion of said electrolyte, substrate leads sealed to and extending into said vitreous envelope, said leads being encapsulated in vitreous material with only the end portions extending into the electrolyte, a substrate having first and second ends disposed in said envelope, said ends being secured to the ends of said leads, a source lead extending into said envelope, and a source material carried within said envelope by said source lead.

2. A memory element as in claim 1 including a second source lead extending into said envelope and adapted to carry source material.

3. A memory element as in claim 1 in which said leads and source lead are carried by a vitreous bead forming a part of the envelope and defining a pedestal disposed in said envelope.

4. A memory element as in claim 3 wherein said leads extend beyond said pedestal and are encapsulated in vitreous material to form spaced supports.

5. A memory element as in claim 3 in which the substrate electrode comprises a metallic wire.

6. A memory element as in claim 1 wherein said leads are supported externally of said envelope by a header to support the memory element and a cover is disposed over the memory element and in cooperation with said header to enclose the memory element.

No references cited.

TERRELL W. FEARS, *Primary Examiner.*